United States Patent
Renke et al.

(10) Patent No.: US 10,512,126 B2
(45) Date of Patent: Dec. 17, 2019

(54) TREATED HEATED WINDOW GRID FOR IMPROVED DURABILITY IN HARSH ENVIRONMENTS

(71) Applicant: GM Global Technology Operations LLC, Detroit, MI (US)

(72) Inventors: David T. Renke, Macomb, MI (US); Thomas D. Hagen, Grand Blanc, MI (US); John M. Moote, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 518 days.

(21) Appl. No.: 15/226,120

(22) Filed: Aug. 2, 2016

(65) Prior Publication Data

US 2018/0042072 A1   Feb. 8, 2018

(51) Int. Cl.
    *H05B 3/84*     (2006.01)
    *C03C 17/04*    (2006.01)
    *C03C 17/00*    (2006.01)
    *C03C 17/34*    (2006.01)

(52) U.S. Cl.
    CPC ............. *H05B 3/84* (2013.01); *C03C 17/008* (2013.01); *C03C 17/04* (2013.01); *C03C 17/34* (2013.01); *C03C 2217/479* (2013.01)

(58) Field of Classification Search
    CPC ............. H05B 2203/031; H05B 3/86; H05B 2214/02; H05B 3/34; G05B 3/84; C03C 17/008; C03C 17/04; C03C 17/34; C03C 17/3435; C03C 17/3458; C03C 17/3673; C03C 17/3681; C03C 17/36; C03C 17/3607; C03C 17/3642; C03C 17/3644; C03C 17/3655; C03C 17/3684; C03C 17/3697; C03C 2217/479; C03C 2217/256; C03C 2218/11; C03C 2218/111; C03C 2218/326; B32B 17/10055; B32B 17/10174; H01B 1/00; C23C 18/1608; Y10T 428/3163; Y10T 428/31645; Y10T 428/31601
    See application file for complete search history.

(56) References Cited

U.S. PATENT DOCUMENTS 2,849,583 A * 8/1958 Pritikin .................... H01B 1/00
                                                    174/256
3,772,075 A * 11/1973 Tarnopol ................. H05B 3/84
                                                    204/488

* cited by examiner

*Primary Examiner* — Shawntina T Fuqua
(74) *Attorney, Agent, or Firm* — Quinn IP Law

(57) ABSTRACT

A number of variations may include a method that may include providing a glass substrate that may include a first surface and a second surface; disposing a ceramic frit that may include at least one bus bar and at least one grid line on the first surface to form a window assembly; bathing the window assembly in a first bath solution; and drying the window assembly.

13 Claims, 1 Drawing Sheet

TREATED HEATED WINDOW GRID FOR IMPROVED DURABILITY IN HARSH ENVIRONMENTS

TECHNICAL FIELD

The field to which the disclosure generally relates includes surface coatings for heated window grids in automobiles.

BACKGROUND

Glass surfaces, automobile windows in particular, may include heated grids that may include a ceramic frit grid. The heated grids may include at least a bus as well as at least one grid line. Exposure of water, salt, sulfur, or other contaminants may degrade the heated grid and its performance.

SUMMARY OF ILLUSTRATIVE VARIATIONS

A number of variations may include a product that may include a window assembly may include a glass substrate and a silver ceramic frit that may include $AgCl_{(s)}$ disposed on the glass substrate.

A number of variations may include a product that may include a window assembly that may include a glass substrate and a silver ceramic frit that may include $AgC_{18}H_{35}O_2$ disposed on the glass.

A number of variations may include a method that may include providing a glass substrate that may include a first surface and a second surface; disposing a ceramic frit that may include at least one bus bar and at least one grid line on the first surface to form a window assembly; bathing the window assembly in a first bath solution; and drying the window assembly.

A number of variations may include a method that may include providing a glass substrate that may include a first surface and a second surface; disposing a silver ceramic frit that may include at least one bus bar and at least one grid line on the first surface to form a window assembly; bathing the window assembly in a first bath solution that may include nitric acid; and drying the window assembly.

A number of variations may include a method that may include providing a glass substrate that may include a first surface and a second surface opposite the first surface; disposing a silver ceramic frit that may include at least one bus bar and at least one grid line on the first surface to form a window assembly; bathing the window assembly in a first bath solution that may include sodium hypochlorite; rinsing the window assembly with de-ionized water; drying the window assembly; bathing the window assembly in a second bath solution that may include a stearic acid solution in toluene; and removing the window assembly from the second bath solution.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Figure 1:
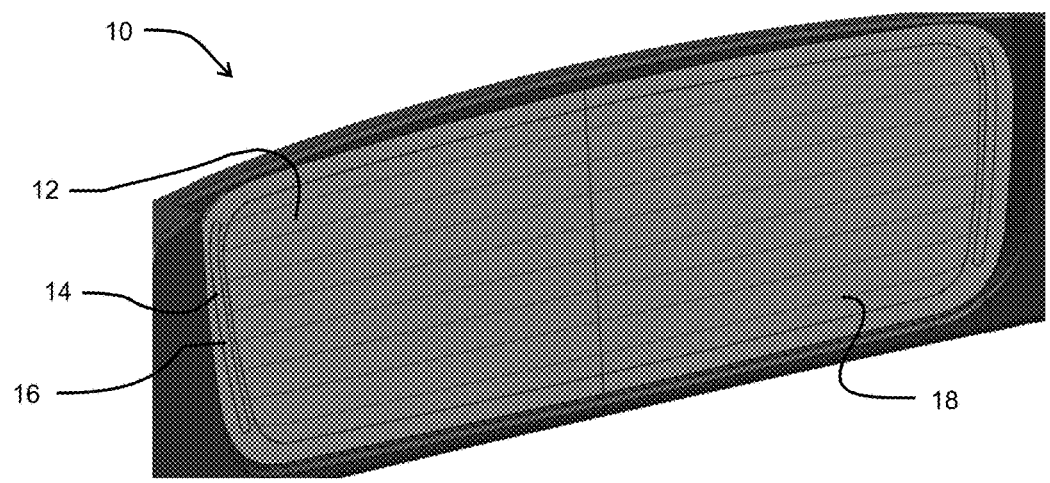
FIG. 1 depicts a treated heated window grid according to a number of variations.

Referring to FIG. 1; a window assembly 10 may include a glass substrate 12 and a ceramic frit/heated window grid 14 that may include at least one bus bar 16 and at least one grid line 18. The heated window grid 14 may be constructed and arranged to heat the window assembly 10.

Figure 2A:
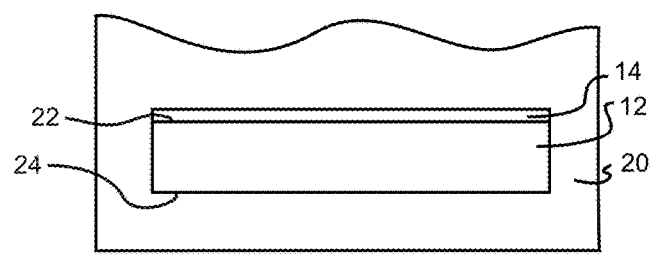
FIG. 2A depicts a method of treating a heated window grid according to a number of variations.
Figure 2B:
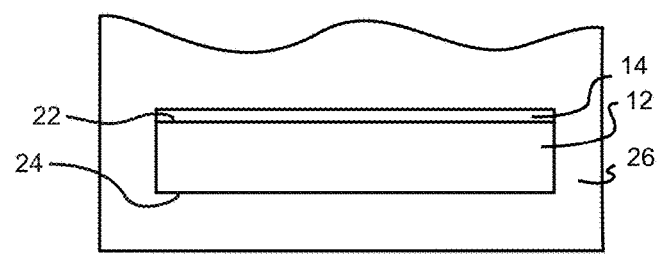
FIG. 2B depicts a method of treating a heated window grid according to a number of variations.

Referring to FIGS. 2A and 2B; a method may include providing a glass substrate 12 that may include a first surface 22 and a second surface 24; disposing a ceramic frit 14 that may include at least one bus bar 16 and at least one grid line 18 on the first surface 22 to form a window assembly 10; bathing the window assembly in a first bath solution 20; and drying the window assembly 10. In another embodiment, the method may include bathing the window assembly 10 in a second bath solution 26 and subsequently removing the window assembly 10 from the second bath solution 26.

A method may include providing a glass substrate having a first surface and a second surface, opposite the first surface, and a ceramic frit or heated window grid that may include silver disposed on the first surface; the combination of the glass substrate and ceramic frit forming a window assembly. The ceramic frit or heated window grid may include at least a first bus bar and at least one gridline constructed and arranged to heat the window assembly. The method may further include submerging the window assembly in a first bath that may include sodium hypochlorite (chlorine bleach) for about less than 30 minutes or to about 60 minutes, rinsing the window assembly in de-ionized water, and drying the window assembly. Alternatively, the method may include submerging the window assembly in a second bath that may include a 3 molar nitric acid solution for about 10 minutes, drying the window assembly, submerging the window assembly in a third bath that may include a stearic acid solution in toluene 20% w/w (a weighed solution of stearic acid and toluene to arrive at a 20% solution) for about 1 hour, and subsequently removing the window assembly from the stearic acid solution in toluene. Alternatively, the method may include submerging the window assembly in a second bath that may include an 8 molar nitric acid solution, drying the window assembly, submerging the window assembly in a third bath that may include a stearic acid solution in toluene 20% w/w (a weighed solution of stearic acid and toluene to arrive at a 20% solution) for about 1 hour, and subsequently removing the window assembly from the stearic acid solution in toluene. The chemical reaction of the heated window grid and the first, second, and/or third bath may form an insoluble and impervious surface coating on the heated window grid. Following the first bath or the third bath, the window assembly may proceed through glass value added processing that may include providing a second glass substrate over the ceramic frit or heated window grid.

According to variation 1, a product may include a window assembly may include a glass substrate and a silver ceramic frit that may include $AgCl_{(s)}$ disposed on the glass substrate.

According to variation 2, a product may include a window assembly that may include a glass substrate and a silver ceramic frit that may include $AgC_{18}H_{35}O_2$ disposed on the glass.

According to variation 3, a method may include providing a glass substrate may include a first surface and a second surface; disposing a ceramic frit may include at least one bus bar and at least one grid line on the first surface to form a window assembly; bathing the window assembly in a first bath solution; and drying the window assembly.

Variation 4 may include a method as set forth in variation 3, wherein the ceramic frit may include silver.

Variation 5 may include a method as set forth in any of variations 3 through 4 wherein the first bath solution may include nitric acid.

Variation 6 may include a method as set forth in any of variations 3 through 5 wherein bathing the window assembly in a first bath solution may include bathing the window assembly in 3 Molar nitric acid for about ten minutes.

Variation 7 may include a method as set forth in any of variations 3 through 5 wherein bathing the window assembly in a first bath solution may include bathing the window assembly in 8 Molar nitric acid for about ten minutes.

Variation 8 may include a method as set forth in any of variations 3 through 4 wherein the first bath solution may include sodium hypochlorite.

Variation 9 may include a method as set forth in any of variations 3 through 4 wherein bathing the window assembly in a first bath solution may include bathing the window assembly in a 5% sodium hypochlorite solution for 30 minutes.

Variation 10 may include a method as set forth in any of variations 3 through 4 wherein bathing the window assembly in a first bath solution may include bathing the window assembly in a 5% sodium hypochlorite solution for 60 minutes.

Variation 11 may include a method as set forth in variation 3 that may include rinsing the window assembly with de-ionized water prior to drying the window assembly.

Variation 12 may include a method as set forth in any of variations 3 through 5 and 8 and 11 and may include bathing the window assembly in a second bath solution may include a stearic acid solution in toluene and subsequently removing the window assembly from the second bath solution.

Variation 13 may include a method as set forth in any of variations 3 through 5 and 8 and 11 and 12 wherein bathing the window assembly in a second bath may include bathing the window assembly in 20% weight-to-weight ratio stearic acid in toluene for one hour.

Variation 14 may include a method as set forth in any of variations 3 through 5 and 8 and 11 and 12 wherein bathing the window assembly in the second bath solution forms $AgC_{18}H_{35}O_2$ on the silver ceramic frit.

Variation 15 may include a method as set forth in any of variations 3 through 5 and 7 through 9 wherein bathing the window assembly in the first bath solution forms $AgCl_{(s)}$ on the silver ceramic frit.

According to variation 16, a method may include providing a glass substrate that may include a first surface and a second surface; disposing a silver ceramic frit that may include at least one bus bar and at least one grid line on the first surface to form a window assembly; bathing the window assembly in a first bath solution that may include nitric acid; and drying the window assembly.

Variation 17 may include a method as set forth in variation 16 wherein bathing the window assembly in a first bath solution forms $AgCl_{(s)}$ on the silver ceramic frit.

According to variation 18, a method may include providing a glass substrate that may include a first surface and a second surface opposite the first surface; disposing a silver ceramic frit that may include at least one bus bar and at least one grid line on the first surface to form a window assembly; bathing the window assembly in a first bath solution that may include sodium hypochlorite; rinsing the window assembly with de-ionized water; drying the window assembly; bathing the window assembly in a second bath solution that may include a stearic acid solution in toluene; and removing the window assembly from the second bath solution.

Variation 19 may include a method as set forth in variation 18 wherein bathing the window assembly in the second bath solution forms $AgC_{18}H_{35}O_2$ on the silver ceramic frit.

The above description of variations of the invention is merely demonstrative in nature and, thus, variations thereof are not to be regarded as a departure from the spirit and scope of the inventions disclosed within this document.

What is claimed is:

1. A method comprising:
   providing a glass substrate comprising a first surface and a second surface;
   disposing a ceramic frit comprising at least one bus bar and at least one grid line on the first surface to form a window assembly;
   bathing the window assembly in a first bath solution; and
   drying the window assembly;
   wherein the first bath solution comprises nitric acid.

2. A method as set forth in claim 1 wherein the ceramic frit comprises silver.

3. A method as set forth in claim 1 wherein bathing the window assembly in a first bath solution comprises bathing the window assembly in 3 Molar nitric acid for about ten minutes.

4. A method as set forth in claim 1 wherein bathing the window assembly in a first bath solution comprises bathing the window assembly in 8 Molar nitric acid for about ten minutes.

5. A method as set forth in claim 1 further comprising rinsing the window assembly with de-ionized water prior to drying the window assembly.

6. A method as set forth in claim 1 further comprising bathing the window assembly in a second bath solution comprises a stearic acid solution in toluene and subsequently removing the window assembly from the second bath solution.

7. A method as set forth in claim 6 wherein bathing the window assembly in a second bath solution comprises bathing the window assembly in 20% weight-to-weight ratio stearic acid in toluene for one hour.

8. A method as set forth in claim 6 wherein bathing the window assembly in the second bath solution forms $AgC_{18}H_{35}O_2$ on the silver ceramic frit.

9. A method as set forth in claim 1 wherein bathing the window assembly in the first bath solution forms $AgCl_{(s)}$ on the silver ceramic frit.

10. A method comprising:
 providing a glass substrate comprising a first surface and a second surface;
 disposing a silver ceramic frit comprising at least one bus bar and at least one grid line on the first surface to form a window assembly;
 bathing the window assembly in a first bath solution comprises nitric acid; and
 drying the window assembly.

11. A method as set forth in claim 10 wherein bathing the window assembly in a first bath solution forms AgCl(s) on the silver ceramic frit.

12. A method comprising:
 providing a glass substrate comprising a first surface and a second surface;
 disposing a silver ceramic frit comprising at least one bus bar and at least one grid line on the first surface to form a window assembly;
 bathing the window assembly in a first bath solution comprises sodium hypochlorite;
 rinsing the window assembly with de-ionized;
 drying the window assembly;
 bathing the window assembly in a second bath solution comprises a stearic acid solution in toluene; and
 removing the window assembly from the second bath solution.

13. A method as set forth in claim 12 wherein bathing the window assembly in the second bath solution forms $AgC_{18}H_{35}O_2$ on the silver ceramic frit.

* * * * *